(12) United States Patent
Arimatsu

(10) Patent No.: US 12,474,687 B2
(45) Date of Patent: Nov. 18, 2025

(54) VIBRATION DIAGNOSIS ASSISTANCE DEVICE, VIBRATION DIAGNOSIS ASSISTANCE METHOD, AND MACHINING TOOL

(71) Applicant: FANUC CORPORATION, Yamanashi (JP)

(72) Inventor: Yohei Arimatsu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 412 days.

(21) Appl. No.: 18/256,447

(22) PCT Filed: Dec. 13, 2021

(86) PCT No.: PCT/JP2021/045731
§ 371 (c)(1),
(2) Date: Jun. 8, 2023

(87) PCT Pub. No.: WO2022/131184
PCT Pub. Date: Jun. 23, 2022

(65) Prior Publication Data
US 2024/0027989 A1    Jan. 25, 2024

(30) Foreign Application Priority Data
Dec. 18, 2020  (JP) ................ 2020-210308

(51) Int. Cl.
*G05B 19/406* (2006.01)
*B23Q 17/12* (2006.01)
(Continued)

(52) U.S. Cl.
CPC .......... *G05B 19/406* (2013.01); *B23Q 17/12* (2013.01); *G01H 1/003* (2013.01); *G05B 19/18* (2013.01);
(Continued)

(58) Field of Classification Search
CPC ................ G05B 19/406; G05B 19/18; G05B 2219/37434; G05B 2219/37435; G01H 1/003; B23Q 17/12
See application file for complete search history.

(56) References Cited

U.S. PATENT DOCUMENTS

2004/0236529 A1    11/2004 Esterling
2017/0329302 A1*   11/2017 Sonoda ................. G05B 19/404
(Continued)

FOREIGN PATENT DOCUMENTS

CN    102407490 A  *  4/2012  ........... G05B 19/404
CN    107390639 A     11/2017
(Continued)

OTHER PUBLICATIONS

International Search Report issued by the Japanese Patent Office acting as the International Searching Authority in relation to International Application No. PCT/JP2021/045731 dated Feb. 8, 2022 (3 pages) along with English language translation (2 pages).
(Continued)

*Primary Examiner* — Benjamin R Schmitt
(74) *Attorney, Agent, or Firm* — CARTER, DELUCA & FARRELL LLP

(57) ABSTRACT

A vibration diagnosis assistance device of an embodiment acquires, for each of a plurality of predetermined rotational speeds, swing frequency characteristics of a rotating shaft when a movable mechanism swings according to a first swing command signal or a second swing command signal in a state where the rotating shaft rotates according to a rotation command signal, and displays the acquired swing frequency characteristics on a display device.

13 Claims, 8 Drawing Sheets

(51) Int. Cl.
    *G01H 1/00*     (2006.01)
    *G05B 19/18*     (2006.01)

(52) U.S. Cl.
    CPC .............. *G05B 2219/37434* (2013.01); *G05B 2219/37435* (2013.01)

(56) References Cited

U.S. PATENT DOCUMENTS

2018/0297163 A1* 10/2018 Sonoda .............. B23Q 15/0075
2018/0297164 A1* 10/2018 Sonoda .................. B23Q 15/14

FOREIGN PATENT DOCUMENTS

| CN | 108733001 A | 11/2018 | |
| JP | H07260564 A | 10/1995 | |
| JP | 2001074547 A | 3/2001 | |
| JP | 2011067887 A | 4/2011 | |
| JP | 2016111897 A | 6/2016 | |
| JP | 2016207021 A | 12/2016 | |
| JP | 2019069490 A * | 5/2019 | ............ B23Q 15/12 |
| JP | 2020078841 A | 5/2020 | |
| JP | 2020106375 A | 7/2020 | |
| JP | 2021146436 A | 9/2021 | |

OTHER PUBLICATIONS

Written Opinion of the International Searching Authority issued by the Japanese Patent Office acting as the International Searching Authority in relation to International Application No. PCT/JP2021/045731 dated Feb. 8, 2022 (5 pages).

Office Action dated Jul. 12, 2025 issued in corresponding Chinese Patent application No. 202180083224.1 (6 pages). pages, no translation available.

* cited by examiner

VIBRATION DIAGNOSIS ASSISTANCE DEVICE, VIBRATION DIAGNOSIS ASSISTANCE METHOD, AND MACHINING TOOL

CROSS-REFERENCE TO RELATED APPLICATIONS

This application is a national phase entry under 35 U.S.C. 371 of PCT International Application No. PCT/JP2021/045731, filed Dec. 13, 2021, which claims priority to Japanese Patent Application No. 2020-210308, filed Dec. 18, 2020, the disclosure of each of these applications is expressly incorporated herein by reference in their entirety.

TECHNICAL FIELD

The present invention relates to a vibration diagnosis support (assistance) device, a vibration diagnosis support (assistance) method, and a machine tool (a machining tool).

BACKGROUND ART

In a machine tool, in order to grasp a vibration characteristic of the machine tool, a case is known in which a motor that is installed on the machine tool is used as a vibration source, and a frequency characteristic is measured. For example, in JP 2016-111897 A, a servo control device is disclosed that detects a resonant frequency from a frequency characteristic. In such a frequency characteristic, there is included a gain, to a sinusoidal input signal that is input in a speed control loop for the servomotor, of an output signal that is output from the speed control loop.

SUMMARY OF THE INVENTION

However, in the servo control device disclosed in JP 2016-111897 A, it is impossible to grasp vibrations that change depending on the cause of the vibrations. For example, in the case of a natural frequency or the like unique to a rotation shaft, the vibration changes in accordance with a rotational speed (rotational frequency) of the rotation shaft. Further, for example, in the case of loosening of a bolt or the like, the manner in which the vibration is generated changes in accordance with the vibration condition. Further, in the servo control device disclosed in JP 2016-111897 A, there is not a function that is capable of grasping the origin of the vibration.

Furthermore, in relation to high-precision machine tools in which particularly high machining accuracy is required, it is important to understand the following items. Specifically, it is important to understand how far the rotational speed (rotational frequency) of the rotation shaft is away from the nearest resonance frequency. In other words, it is essential to understand in what vicinity the rotational speed exists at which the rotation shaft will rotate with greater stability and quietness. However, conventionally, it has been difficult for a high-precision machine tool to determine the aforementioned items. Further, conventionally, a function has not existed to identify and explicitly indicate a "recommended rotational speed for machining" or a "recommended rotational speed of a spindle", which can achieve a high machining accuracy.

Thus, a first object of the present invention is to provide a vibration diagnosis support device, a vibration diagnosis support method, and a machine tool, which are capable of grasping a frequency characteristic while taking into consideration a natural frequency, the movement of a resonance point, and the like. Further, a second object of the present invention is to provide a vibration diagnosis support device, a vibration diagnosis support method, and a machine tool that facilitate the realization of ultra-high precision machining. In a high-precision machine tool, it is extremely effective to grasp a distribution state of resonance points of the spindle for each of rotational speeds of the spindle. It is possible to add a function of clarifying the distribution state of vibrations, and furthermore, of explicitly indicating the "recommended rotational speed for machining" or the "recommended rotational speed of a spindle". In accordance with such features, it is possible to provide a support function that informs an operator of a recommended rotational speed that enables machining to be performed with high accuracy, and that enables even an inexperienced operator to easily be informed of a candidate for an ideal rotational speed for machining.

A first aspect of the present invention is characterized by a vibration diagnosis support device configured to support diagnosis of vibration of a rotation shaft unit of a machine tool including a numerical control device, the vibration diagnosis support device including:
  a movable mechanism installed on the machine tool;
  a mechanism control unit configured to drive the movable mechanism;
  a swing command signal delivery unit configured to deliver, to the mechanism control unit, a first swing command signal in which a frequency thereof changes so as to become higher over time, or a second swing command signal in which a frequency thereof changes so as to become lower over time;
  a rotation shaft control unit configured to rotate a rotation shaft installed on the rotation shaft unit;
  a rotation command signal delivery unit configured to deliver a rotation command signal to the rotation shaft control unit;
  an acquisition unit configured to acquire a swing frequency characteristic of the rotation shaft for each of a plurality of predetermined rotational speeds, at a time when the movable mechanism is swung in accordance with the first swing command signal or the second swing command signal in a state in which the rotation shaft is rotating in accordance with the rotation command signal; and
  a display control unit configured to cause a display device to display thereon the swing frequency characteristic acquired by the acquisition unit.

A second aspect of the present invention is characterized by a machine tool, including the above-described vibration diagnosis support device, at least one of the rotation shaft unit or a spindle unit, and at least one of the movable mechanism. Moreover, the vibration diagnosis support device may be implemented as a function in a numerical control device that is installed in the machine tool, or may be built into a personal computer and connected to the numerical control device to deliver commands to the numerical control device. Further, the rotation shaft and the movable mechanism may be respective shafts that are installed on a machine tool, and which are controlled by the numerical control device.

A third aspect of the present invention is characterized by a vibration diagnosis support method for supporting diagnosis of vibration of a rotation shaft unit of a machine tool, the vibration diagnosis support method including:

a rotating step of rotating a rotation shaft installed on the rotation shaft unit, in accordance with a rotation command signal;

a swinging step of swinging a movable mechanism of the machine tool in accordance with a first swing command signal in which a frequency thereof changes so as to become higher over time, or a second swing command signal in which a frequency thereof changes so as to become lower over time;

an acquisition step of acquiring a swing frequency characteristic for each of a plurality of predetermined rotational speeds, at a time when the movable mechanism is swung in accordance with the first swing command signal or the second swing command signal in a state in which the rotation shaft is rotating in accordance with the rotation command signal; and a display control step of causing a display device to display thereon the swing frequency characteristic acquired in the acquisition step.

In accordance with such features, the natural frequency having a property which is unique to the rotation shaft, and the resonance point, which is moved in accordance with the property of the vibration source, are taken into consideration. Accordingly, a more detailed frequency characteristic of the rotation shaft can be indicated. Furthermore, it is possible to indicate a detailed distribution of the natural frequencies. As a result, it becomes easy to search for a rotational speed that is as far away from the natural frequency as possible, and further, that rotates more quietly. In particular, in the case that the rotation shaft is the spindle, it becomes easy to obtain a highly-accurately machined surface. Furthermore, using such a result, it also becomes possible to estimate the cause of an abnormal vibration. With an ultra-high precision machine tool in which particularly high machining accuracy is required, machining with higher accuracy is made possible, and thus a significant advantage is obtained.

DETAILED DESCRIPTION OF THE INVENTION

Embodiment

Figure 1:
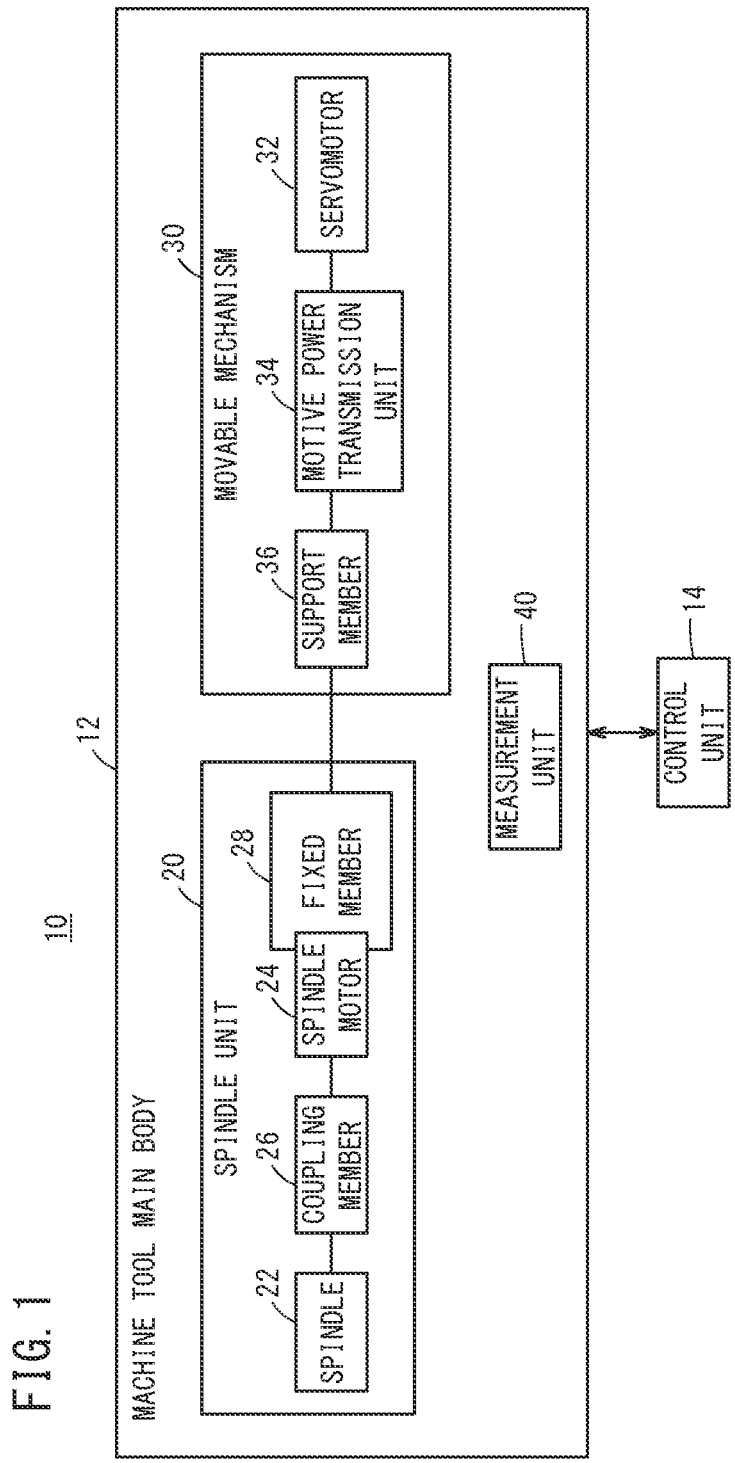
FIG. 1 is a schematic diagram showing a machine tool.

FIG. 1 is a schematic diagram showing a machine tool 10. The machine tool 10 uses a tool and thereby machines an object to be machined or a workpiece. The machine tool 10 may be a high-precision machine tool having a machining accuracy of less than or equal to 100 µm. Further, the machine tool 10 may be an ultrahigh-precision machine tool having a machining accuracy of less than or equal to 10 µm. Moreover, as the machine tool 10, there is a lathing machine, a machining center, or the like. The lathing machine carries out machining by causing the workpiece, which is in a rotating state, to be brought into contact with a fixed tool. The machining center carries out machining by causing a tool, which is in a rotating state, to be brought into contact with the workpiece. The machine tool 10 is equipped with a machine tool main body 12, and a control unit 14.

The machine tool main body 12 is a main body that uses a tool and thereby carries out machining on the workpiece. The machine tool main body 12 includes a spindle unit 20 as a rotation shaft unit, a movable mechanism 30, and a measurement unit 40.

The spindle unit 20 supports a spindle 22 so that the spindle 22 is capable of moving along a predetermined direction. In the case that the machine tool 10 is a lathing machine, the spindle unit 20 corresponds to a spindle stock. In the case that the machine tool 10 is a machining center, the spindle unit 20 corresponds to a spindle head. The spindle unit 20 includes the spindle 22, a spindle motor 24, a coupling member 26, and a fixed member 28.

The spindle motor 24 drives the spindle 22. The spindle motor 24 may be a direct drive type of built-in motor. The coupling member 26 connects the spindle motor 24 and the spindle 22. The coupling member 26 may include a motive power transmission element such as a gear, a belt, a clutch, a joint, or the like. Moreover, in the case that the spindle motor 24 is a built-in motor, since the spindle motor 24 is directly connected to the spindle 22, the coupling member 26 need not be provided. In other words, there are cases in which the spindle unit 20 does not include the coupling member 26. The fixed member 28 represents a member that does not rotate in conjunction with the spindle 22, such as a stator of the spindle motor 24 or the like. The fixed member 28, for example, may be a housing such as a motor housing, a spindle housing, or the like.

The movable mechanism 30 is a mechanism that operates along the movement axis of the machine tool 10. The movable mechanism 30 includes a linear axis, or alternatively, a rotating axis. The direction in which the movable mechanism 30 operates is set as desired. The direction in which the movable mechanism 30 operates may be a first direction in which the spindle 22 extends. Alternatively, the direction in which the movable mechanism 30 operates may be a second direction perpendicular to the first direction in a plane. Alternatively, the direction in which the movable mechanism 30 operates may be a third direction perpendicular to each of the first direction and the second direction. Alternatively, the direction in which the movable mechanism 30 operates may be another direction other than the first direction, the second direction, and the third direction. Further, in the case of being a rotation shaft, the direction in which the rotation shaft extends is set as desired. The movable mechanism 30 may be used as a vibration source with respect to the spindle unit 20. The spindle unit 20 may be installed on the movable mechanism 30, but need not necessarily be installed thereon. The movable mechanism 30 includes a servomotor 32, a motive power transmission unit 34, and a support member 36.

The servomotor 32 may be a linear motor or may be a rotating motor. The motive power transmission unit 34 transmits a driving force of the servomotor 32 to the support member 36. The motive power transmission unit 34 may be a ball screw or the like that converts the driving force (a rotational force) of the servomotor 32 into linear motion and transmits the linear motion to the support member 36. Further, the motive power transmission unit 34 may transmit the driving force (a thrust force) of the servomotor 32 as it is to the support member 36. Furthermore, the motive power transmission unit 34 may include a power transmission element such as a gear, a belt, a clutch, a joint, or the like. The support member 36 supports a movable object. In the case that the spindle unit 20 is installed on the movable mechanism 30, the spindle unit 20 serves as the movable object. In this case, the support member 36 supports the fixed member 28 of the spindle unit 20. On the other hand, in the case that the spindle unit 20 is not installed on the movable mechanism 30, the movable object is a member that differs from the spindle unit 20. In this case, the support member 36 supports a member other than the spindle unit 20.

The measurement unit 40 measures a physical quantity for the purpose of obtaining the state of the spindle unit 20. As the physical quantity, there is employed at least one from among a loudness of sound (a sound pressure or the like), a magnitude of vibration (a displacement, a speed, an acceleration, or the like), an angle, an angular speed, or an angular acceleration or the like of the spindle 22. The physical quantity representing the magnitude of vibration may be a direction of rotation of the spindle 22. The installed position where the measurement unit 40 is installed may be any position on the machine tool main body 12. In general, the closer the installed position is to the spindle unit 20, which is a rotation shaft (the spindle 22) that serves as a measurement target, the more preferable it is. This is because the effect of such a vibration can be easily transmitted, and thus the measurement can be performed with greater accuracy. The measurement unit 40 may include a sensor that is installed on the machine tool 10. In particular, detectors that are used to control each of the movement axes of the machine tool 10 are suitable for such a sensor. Among such detectors, a detector that can more easily measure vibrations of the target rotation shaft unit (the spindle unit 20) may be selected, and may be included in the measurement unit 40. In the case that a drive source for each of the axes is an electric motor, a drive current may be used as the physical quantity representing the magnitude of vibration. In particular, the value of a current at which a stopped state is maintained is suitable as the physical quantity representing the magnitude of vibration. According to the present embodiment, the measurement unit 40 measures the angle of rotation (position) of the servomotor 32.

Figure 2:
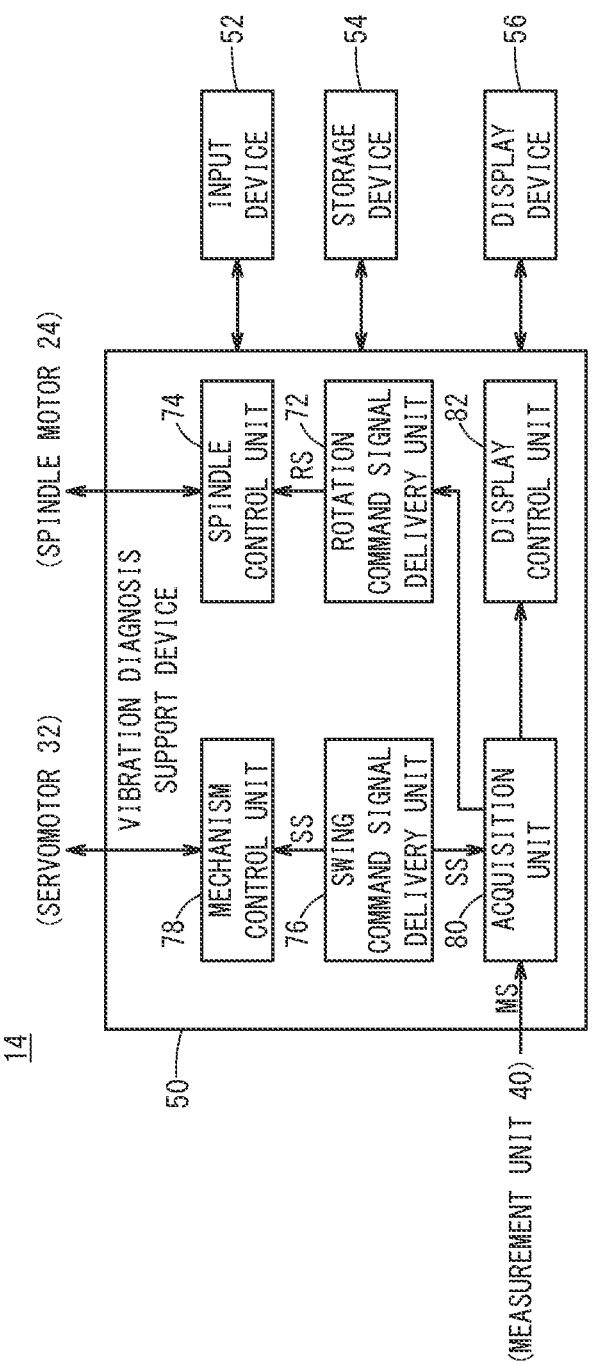
FIG. 2 is a block diagram showing a configuration of a control unit.

The control unit 14 serves to control the machine tool main body 12. FIG. 2 is a block diagram showing the configuration of the control unit 14. The control unit 14 includes a vibration diagnosis support device 50, an input device 52, a storage device 54, and a display device 56. The vibration diagnosis support device 50 supports diagnosing the vibrations of the spindle unit 20. The vibration diagnosis support device 50 may be a numerical control device that controls the machine tool main body 12, or may be a general purpose personal computer. In the case of the vibration diagnosis support device 50 being a general purpose personal computer, a numerical control device for controlling the machine tool 10 and the personal computer are connected. The input device 52 serves to input information. The input device 52 may be a keyboard, a mouse, or the like, or may be input keys that are installed on the numerical control device. The storage device 54 serves to store information. The storage device 54 may be a hard disk, a portable memory, or the like. The display device 56 serves to display information. The display device 56 may be a liquid crystal display, an organic EL display, or the like. Moreover, the input device 52 and the display device 56 may be integrated, for example, as in a teach pendant. Alternatively, the input device 52 and the display device 56 may be installed in a numerical control device, or may be connected to the general purpose personal computer.

The vibration diagnosis support device 50 includes a processor such as a CPU or a GPU or the like, and a storage unit. The storage unit includes a volatile memory such as a RAM or the like, and a non-volatile memory such as a ROM, a flash memory, a hard disk, or the like. At least a portion of the storage unit may be provided in the processor. The vibration diagnosis support device 50 according to the present embodiment includes a rotation command signal delivery unit 72, a spindle control unit 74, a swing command signal delivery unit 76, a mechanism control unit 78, an acquisition unit 80, and a display control unit 82. The rotation command signal delivery unit 72, the spindle control unit 74, the swing command signal delivery unit 76, the mechanism control unit 78, the acquisition unit 80, and the display control unit 82 may be implemented by the processor processing a program that is stored in the storage unit. Further, at least one of the rotation command signal delivery unit 72, the spindle control unit 74, the swing command signal delivery unit 76, the mechanism control unit 78, the acquisition unit 80, of the display control unit 82 may be realized by an integrated circuit such as an ASIC, an FPGA, or the like. Further, at least one of the rotation command signal delivery unit 72, the spindle control unit 74, the swing command signal delivery unit 76, the mechanism control unit 78, the acquisition unit 80, or the display control unit 82 may be constituted by an electronic circuit including a discrete device.

The rotation command signal delivery unit 72 delivers a rotation command signal RS to the spindle control unit 74. The rotation command signal RS is a signal that determines the rotational speed (spindle rotational speed) of the spindle 22. The spindle control unit 74 causes the spindle 22 to be rotated by controlling the spindle motor 24 of the spindle unit 20 in accordance with the rotation command signal RS. Moreover, in the case that the rotational speed determined by the rotation command signal RS is zero, the spindle 22 is in a non-rotating state (stationary state).

The swing command signal delivery unit 76 delivers a swing command signal SS to the mechanism control unit 78. The swing command signal SS is a signal for controlling the servomotor 32. More specifically, the swing command signal SS is a signal in order to cause the servomotor 32 to repeatedly execute a swinging operation. The swinging operation implies an operation in which the motor shaft of the servomotor 32 is reversed after having been rotated (displaced) in a positive direction from a predetermined reference position, and is reversed again after having been rotated (displaced) in a negative direction and having passed through the reference position. In addition, the swinging operation implies that the motor shaft of the servomotor 32 alternately repeats being positively rotated and negatively rotated between a first rotation position and a second rotation position. Moreover, the first rotation position is a position of being rotated (displaced) by a predetermined amount in the positive direction from the reference position, and the second rotation position is a position of being rotated (displaced) by a predetermined amount in the negative direction from the reference position.

Figure 3:
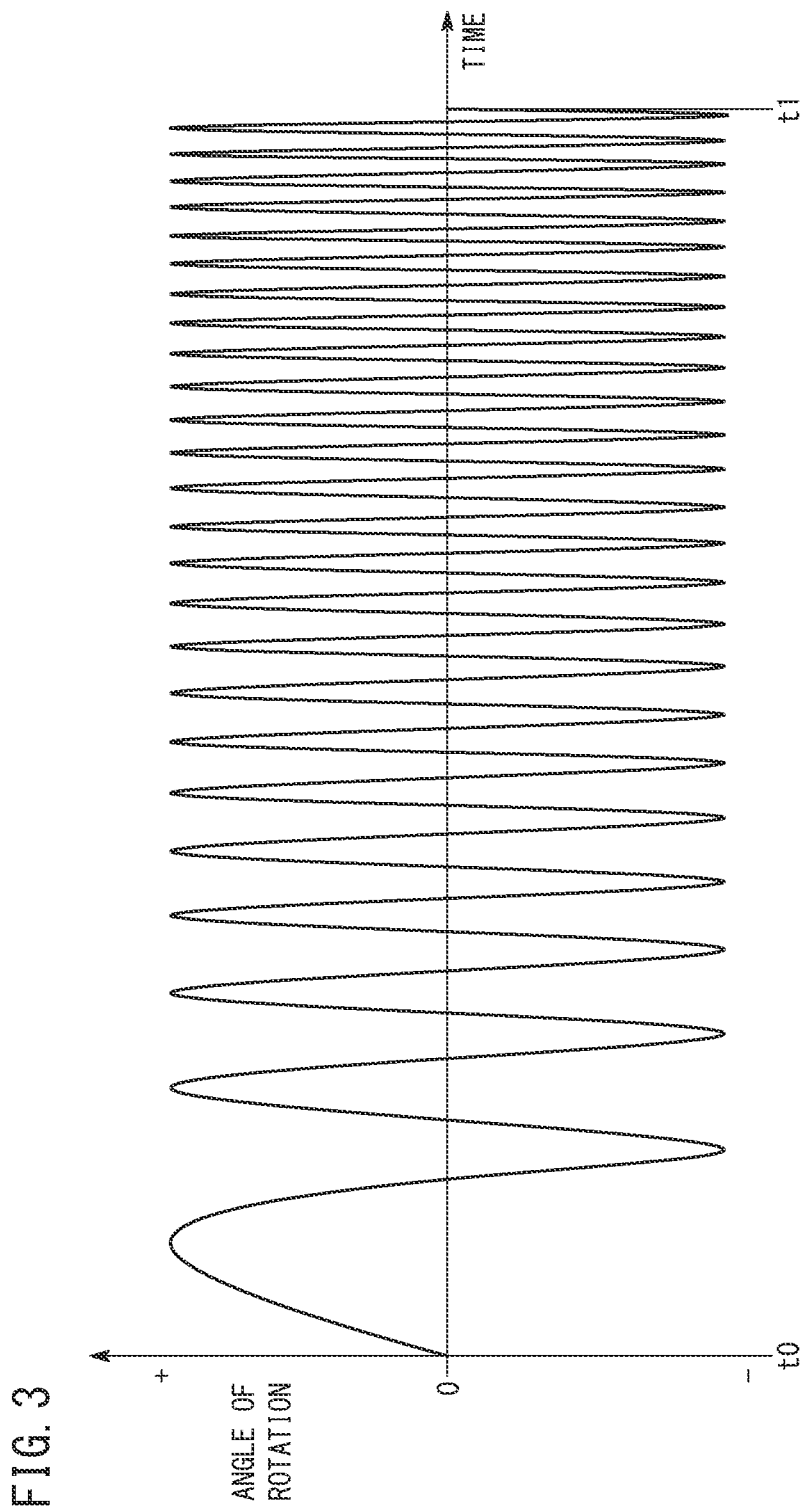
FIG. 3 is a diagram showing an example of a swing command signal.

FIG. 3 is a diagram showing an example of the swing command signal SS. The value of "0" of the swing command signal SS indicates the reference position. Further, the value of the swing command signal SS having a + sign (positive sign) indicates an angle of rotation (amount of displacement) of the servomotor 32 that is positively rotated from the reference position. The value of the swing command signal SS having a − sign (negative sign) indicates an angle of rotation (amount of displacement) of the servomotor 32 that is negatively rotated from the reference position. As the value (absolute value) of the swing command signal SS moves further away from the reference position "0", the angle of rotation (amount of displacement) of the servomotor 32 with respect to the reference position becomes greater.

In the swing command signal SS, the frequency thereof changes so as to gradually become higher (up chirp) over time. The phrase "the frequency thereof gradually becomes higher" includes cases in which the frequency becomes higher continuously and smoothly without interruption, or in which the frequency becomes higher in a stepwise manner. Moreover, in the swing command signal SS, the frequency thereof may change so as to gradually become higher over time within a predetermined frequency range.

The swinging of the servomotor 32 (the movable mechanism 30) in accordance with the swing command signal SS becomes more rapid over time. Moreover, the amplitude of the swing command signal SS may be constant regardless of the passage of time. In the case that the amplitude is constant regardless of the passage of time, the angle of rotation (the amount of displacement) at which the servomotor 32 is rotated (displaced) in the forward direction from the reference position, and the angle of rotation (the displacement) at which the servomotor 32 is rotated (displaced) in the reverse direction from the reference position is the same angle of rotation.

The mechanism control unit 78 causes the servomotor 32 to be periodically swung in accordance with the swing command signal SS. By the movable mechanism 30 being swung in accordance with the swinging of the servomotor 32, the spindle unit 20, which is supported by the support member 36 of the movable mechanism 30, swings. In other words, by controlling the servomotor 32 in accordance with the swing command signal SS, the mechanism control unit 78 causes the movable mechanism 30 to be swung as the vibration source with respect to the spindle unit 20.

The acquisition unit 80 acquires the swing frequency characteristic of the movable mechanism 30 in a state in which the spindle 22 is rotating in accordance with the rotation command signal RS. The swing frequency characteristic is a frequency characteristic at a time when the movable mechanism 30 is swung as the vibration source in accordance with the swing command signal SS. The acquisition unit 80 acquires the swing frequency characteristic for each of a plurality of predetermined spindle rotational speeds.

Upon receiving a measurement start command from the input device 52, the acquisition unit 80 outputs a switching signal to the rotation command signal delivery unit 72, and sequentially switches the spindle rotational speed determined by the rotation command signal RS to one of the plurality of predetermined spindle rotational speeds.

Further, at each of predetermined time intervals, the acquisition unit 80 acquires the swing frequency characteristics based on the swing command signal SS, and a measurement signal MS. The measurement signal MS is a signal that is measured by the measurement unit 40 at a time when the movable mechanism 30 is swinging in accordance with the swing command signal SS. When the swing frequency characteristics are acquired, the acquisition unit 80 stores the swing frequency characteristics in the storage device 54.

As the swing frequency characteristic, a frequency characteristic of any one from among an amplitude (displacement), a speed, an acceleration, and a sound pressure is used. In the case of the present embodiment, the swing frequency characteristic is a gain characteristic, which is an amplitude ratio between the swing command signal SS and the measurement signal MS at each of a plurality of swing frequencies. In this case, the amplitude ratio between the input signal (the swing command signal SS) input to the servomotor 32 and the measurement signal MS, measured by the measurement unit 40, corresponding to the input signal is acquired for each of the swing frequencies. Moreover, the acquisition unit 80 may acquire as the swing frequency characteristic a power spectrum density for each of the plurality of swing frequencies. In this case, the acquisition unit 80 can obtain the power spectrum density based on a Fourier spectrum of a waveform of the sound pressure, the vibration, the current at a time when the other shafts are stopped, or the like.

The display control unit 82 causes the display device 56 to display the swing frequency characteristics acquired by the acquisition unit 80 for each of the plurality of predetermined spindle rotational speeds. Consequently, the display control unit 82 can enable the operator to recognize a rotational frequency that is suitable for machining. More specifically, it becomes possible to narrow down a spindle rotational speed region in which the spindle 22 rotates stably and quietly. If machining is performed at a spindle rotational speed at which the spindle 22 rotates stably and quietly, machining conditions such as dimensions, surface roughness, and the like can be realized with high machining accuracy. In particular, such an effect is significant in an ultra-high precision machine tool in which fine machining accuracy, namely, a machining accuracy of 10 nanometers or less, is required.

Figure 4:
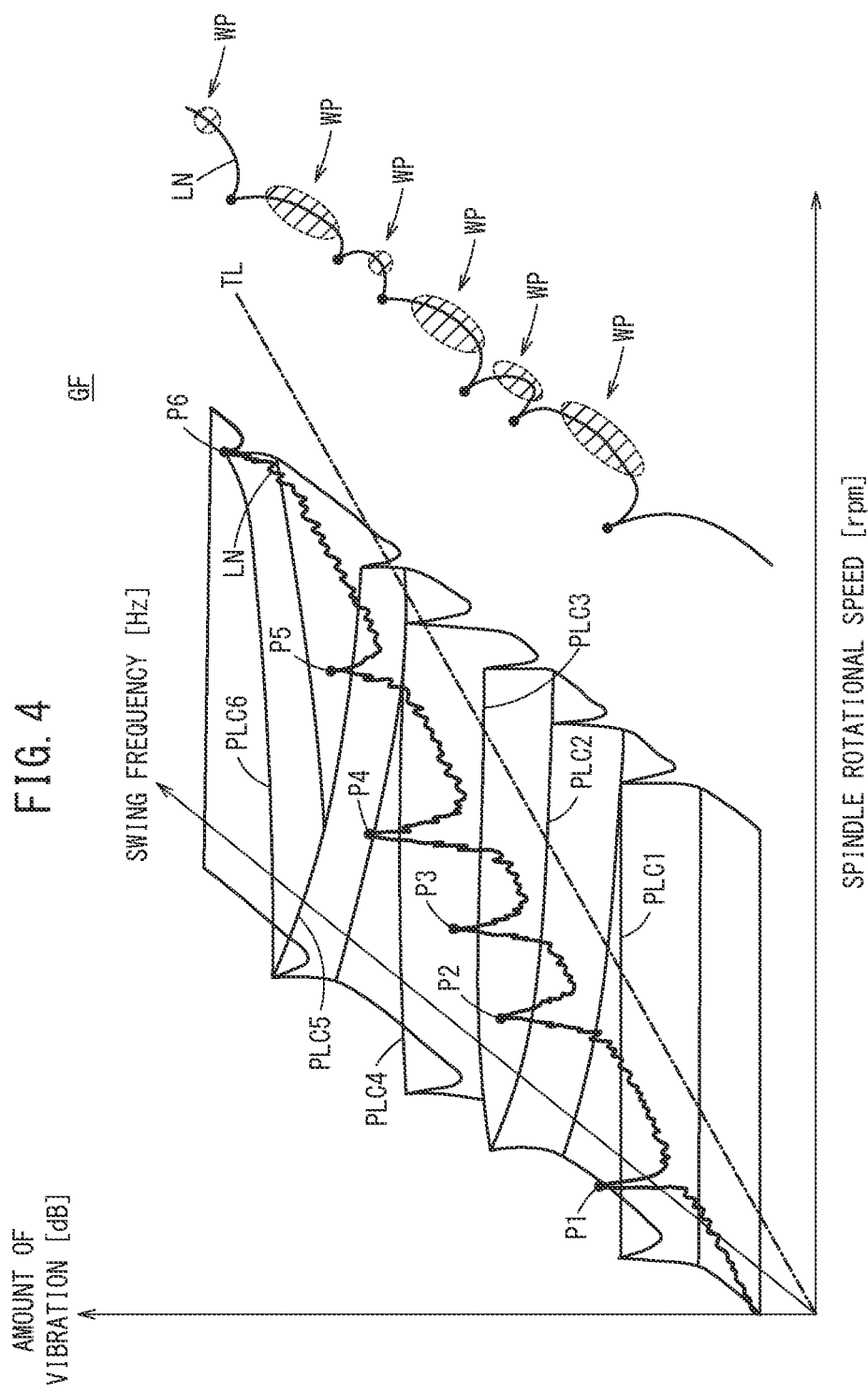
FIG. 4 is a diagram showing an example of a swing frequency characteristic.

FIG. 4 is a diagram showing an example of displaying the swing frequency characteristics. The display control unit 82 may cause there to be displayed on the display device 56 as a characteristic diagram GF the swing frequency characteristics for each of the spindle rotational speeds acquired by the acquisition unit 80. Moreover, the characteristic diagram GF may be a three-dimensional diagram in which the first axis is the rotational speed of the spindle, the second axis is the swing frequency, and the third axis is an amount of vibration (see FIG. 4). The amount of vibration is a quantity representing the magnitude of vibration. The amount of vibration may be an amplitude, a speed, an acceleration, a loudness of sound (sound pressure), or alternatively, a power spectrum density obtained from a Fourier spectra of such values. The magnitude of vibration may be represented by an absolute value, or may be represented by a relative value. Further, the characteristic diagram may be a two-dimensional diagram in which the first axis is the spindle rotational speed, and the second axis is the swing frequency. In the case of being a two-dimensional display, the size, the color, the shape, etc., of the plot may be devised in a manner so that changes in the magnitude of vibration can be understood. The spindle rotational speed shown in FIG. 4 may be converted into a rotational frequency [Hz].

The display control unit 82 may display a transport line TL as an auxiliary line together with the characteristic diagram GF. The transport line TL is an auxiliary line in which points where the rotational frequencies corresponding to the spindle rotational speeds and the swing frequencies are equal to each other are connected, and such an auxiliary line is drawn on a plane including the first axis and the second axis.

The display control unit 82 may cause there to be displayed in the characteristic diagram GF a line LN obtained by connecting the peaks of a waveform (a three-dimensional waveform or a two-dimensional waveform) representing the frequency characteristics. This line LN is drawn by projecting the two-dimensional transport line TL onto a three-dimensional characteristic diagram GF. More specifically, the line LN is a line in which a plane (a transport plane) that passes through the transport line TL and is parallel to the third axis intersects with the plane of the characteristic diagram GF. The display control unit 82 may emphasize the line LN. For example, the display control unit 82 is capable of emphasizing such a line LN, by displaying the transport line TL on the characteristic diagram GF, and extracting the line LN from the characteristic diagram GF (refer to FIG. 4). For example, the display control unit 82 is capable of emphasizing such a line LN, by classifying in colors (i.e., color-coding) the line LN and the other waveforms on the characteristic diagram GF.

Moreover, the line LN can be generated by interpolating the peaks of a waveform (a three-dimensional waveform or a two-dimensional waveform) indicating the frequency characteristics. In the case of extracting the line LN from the characteristic diagram GF, the method of interpolating for the line LN on the characteristic diagram GF and the method of interpolating for the line LN extracted from the characteristic diagram GF may be different. The interpolation method includes, for example, a Lagrangian interpolation, a spline interpolation, or the like. The larger the quantity of data prior to the interpolation is, the higher the accuracy of the interpolation becomes. Therefore, the larger the number of data of the swing frequency characteristics, the more preferable it is. Further, it is preferable that the rotational speed of the rotation shaft (the spindle 22) during swinging should be varied in steps of a smaller size, i.e., the more number of steps. For this reason, an operation may be performed in which the acquisition of the data may be automatically run at night, and the data for drawing the detailed characteristic diagram GF may be acquired the next morning.

The peaks on the line LN represent certain resonance points. For example, several ones from among the peaks appearing on the line LN are commonly referred to as critical speeds. The critical speeds are resonance points at which resonance with a natural frequency due to an elastic element occurs. Such an elastic element can be included in the spindle 22 body (the rotation shaft itself) or in a supporting element (a bearing or the like) of the spindle 22.

In a peak group PLC1 and a peak group PLC4 of the characteristic diagram GF, the frequencies at which the peaks appear on the swing frequency characteristics are generally constant regardless of the value of the rotational frequency (the spindle rotational speed). These peak groups PLC1 and PLC4 do not depend on the spindle rotational speed (the rotational frequency). Therefore, it can be understood that the peak groups PLC1 and PLC4 are irrelevant to the rotation of the spindle 22, and in the peak groups PLC1 and PLC 4, resonance with the natural frequency of a stationary element occurs. More specifically, for example, resonance with the natural frequency of a structural part of the spindle unit 20.

Further, in a peak group PLC3 and a peak group PLC6 of the characteristic diagram GF, the frequencies at which the peaks appear on the swing frequency characteristics change in a manner so as to rise in accordance with the rising of the rotational frequency (the spindle rotational speed). On the other hand, in a peak group PLC2 and a peak group PLC5 of the characteristic diagram GF, the frequencies at which the peaks appear on the swing frequency characteristics change in a manner so as to descend in accordance with the rising of the rotational frequency (the spindle rotational speed). It can be understood that, in these peak groups PLC2, PLC3, PLC5, and PLC6, resonance with a natural frequency due to certain elastic elements occurs. More specifically, for example, in the peak groups, resonance with a natural frequency of a bending mode due to the elasticity of the shaft occurs.

The points P1 to P6 where the line LN intersects with the peak groups PLC1 to PLC6 imply that the spindle rotational speed and the natural frequencies coincide with each other. Vibrations at the natural frequencies of the respective points P1 to P6 are caused in accordance with the rotation of the spindle 22, and cause resonance to occur. In other words, this implies that the vibration at a time when the spindle 22 rotates increases in the vicinity of these points P1 to P6. Conversely, in the rotational frequency regions between these points P1 to P6, which are separated from these points P1 to P6, ranges WP having a vibration condition (an amplitude, a speed, an acceleration, a noise, or the like) of less than or equal to a predetermined threshold value are rotational speed regions in which the vibration becomes smaller than before and after the points P1 to P6. That is, in the ranges WP, the spindle rotational speed is suitable for machining.

The display control unit 82 may cause the ranges WP in which the spindle rotational speed is suitable for machining, to be displayed within the line LN, or on the basis of a preset threshold value, may cause the ranges WP in which the spindle rotational speed is suitable for machining, to be displayed.

Figure 5:
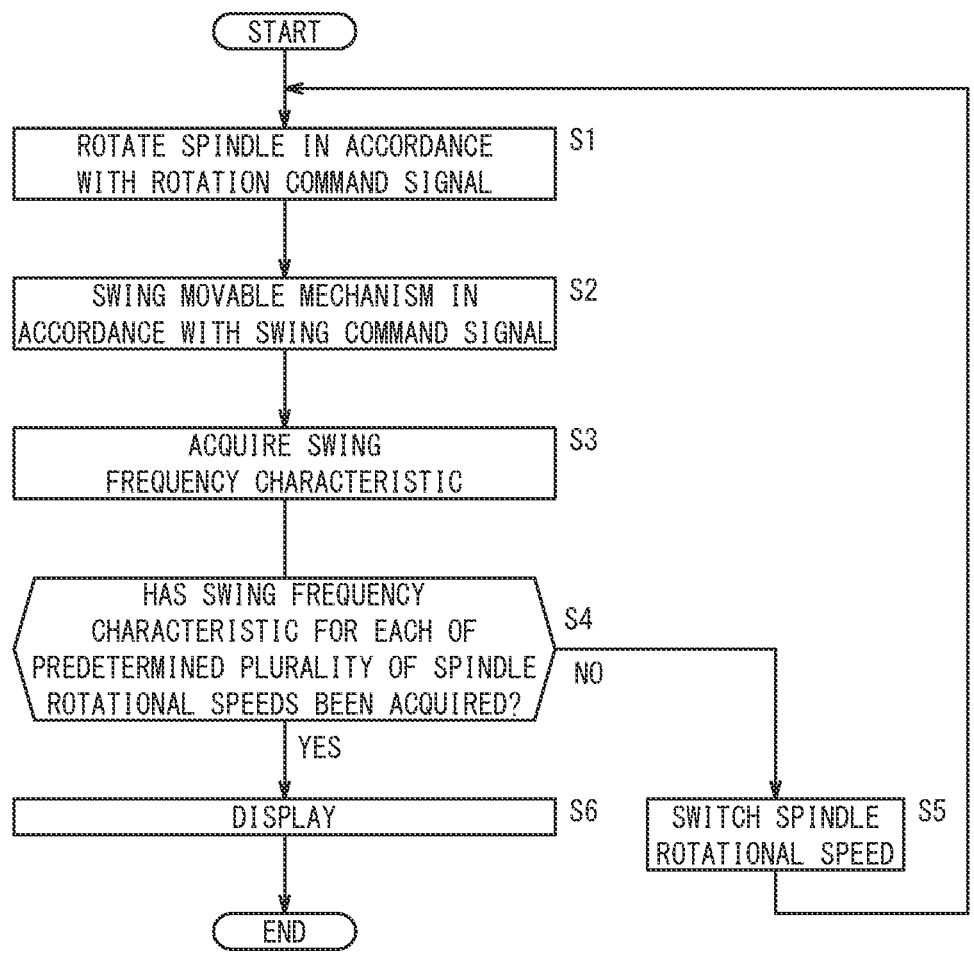
FIG. 5 is a flowchart showing a process flow of a vibration diagnosis support process.

Next, the process flow of the vibration diagnosis support process of the vibration diagnosis support device 50 will be described in relation to the vibration diagnosis support method to support the diagnosis of the vibration (refer to FIG. 5).

For example, in the case that a measurement start command is received from the input device 52, the vibration diagnosis support process transitions to step S1. In step S1, the rotation command signal delivery unit 72 delivers the rotation command signal RS indicating the spindle rotational speed that was set, to the spindle control unit 74. The spindle control unit 74 causes the spindle 22 to be rotated by controlling the spindle motor 24 of the spindle unit 20 in accordance with the rotation command signal RS. When the spindle 22 is rotated in accordance with the rotation command signal RS, the vibration diagnosis support process transitions to step S2.

In step S2, the swing command signal delivery unit 76 delivers the swing command signal SS to the mechanism control unit 78. The mechanism control unit 78 controls the servomotor 32 of the movable mechanism 30 in accordance with the swing command signal SS, and thereby causes the movable mechanism 30 to be swung. When the movable mechanism 30 is swung in accordance with the swing command signal SS, the vibration diagnosis support process transitions to step S3.

In step S3, in a state in which the spindle 22 is rotating in accordance with the rotation command signal RS, the acquisition unit 80 acquires the swing frequency characteristic at a time when the movable mechanism 30 is swung in accordance with the swing command signal SS. When the swing frequency characteristics are acquired, the vibration diagnosis support process transitions to step S4.

In step S4, the acquisition unit 80 determines whether or not the swing frequency characteristics for each of the plurality of predetermined spindle rotational speeds have been acquired. In the case of there being a swing frequency characteristic with respect to a spindle rotational speed that has not yet been acquired, from among the swing frequency characteristics with respect to the plurality of predetermined spindle rotational speeds, the vibration diagnosis support process transitions to step S5. Conversely, in the case that there is not a swing frequency characteristic with respect to the spindle rotational speed that has not yet been acquired, the vibration diagnosis support process transitions to step S6.

In step S5, the acquisition unit 80 switches the spindle rotational speed that is currently set, to the spindle rotational speed corresponding to the swing frequency characteristic that has not yet been acquired. When the spindle rotational speed is switched, the vibration diagnosis support process returns to step S1.

In step S6, the display control unit 82 causes the display device 56 to display the swing frequency characteristics (gain characteristics) acquired for each of the plurality of spindle rotational speeds determined in step S4. When the swing frequency characteristics are displayed, the vibration diagnosis support process is brought to an end.

Moreover, it should be noted that the order of the steps in the aforementioned vibration diagnosis support process is an example, and an order other than the order described above may be used. For example, each time that the swing frequency characteristic of one spindle rotational speed is acquired, the waveform thereof may be added to the display device 56.

The above-described embodiment may be modified in the following manner.

(Exemplary Modification 1)

Figure 6:
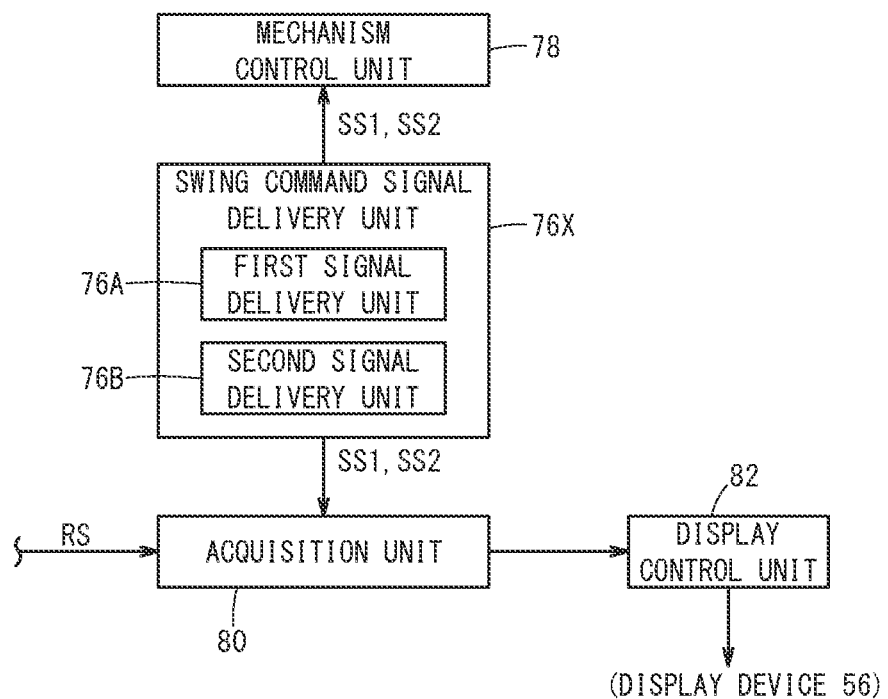
FIG. 6 is a diagram showing a portion of a vibration diagnosis support device according to an Exemplary Modification 1.

FIG. 6 is a diagram showing a portion of the vibration diagnosis support device 50 according to an Exemplary Modification 1. Moreover, it should be noted that the same reference numerals are assigned to the same constituent elements as those described in the above embodiment. In the Exemplary Modification 1, descriptions that overlap or are duplicative of those stated in the above-described embodiment will be omitted.

In the vibration diagnosis support device 50 according to Exemplary Modification 1, the swing command signal delivery unit 76 of the above-described embodiment is changed to a swing command signal delivery unit 76X.

The swing command signal delivery unit 76X includes a first signal delivery unit 76A that delivers a first swing command signal SS1, and a second signal delivery unit 76B that delivers a second swing command signal SS2. The first swing command signal SS1 is the same signal as the swing command signal SS of the above-described embodiment.

Figure 7:
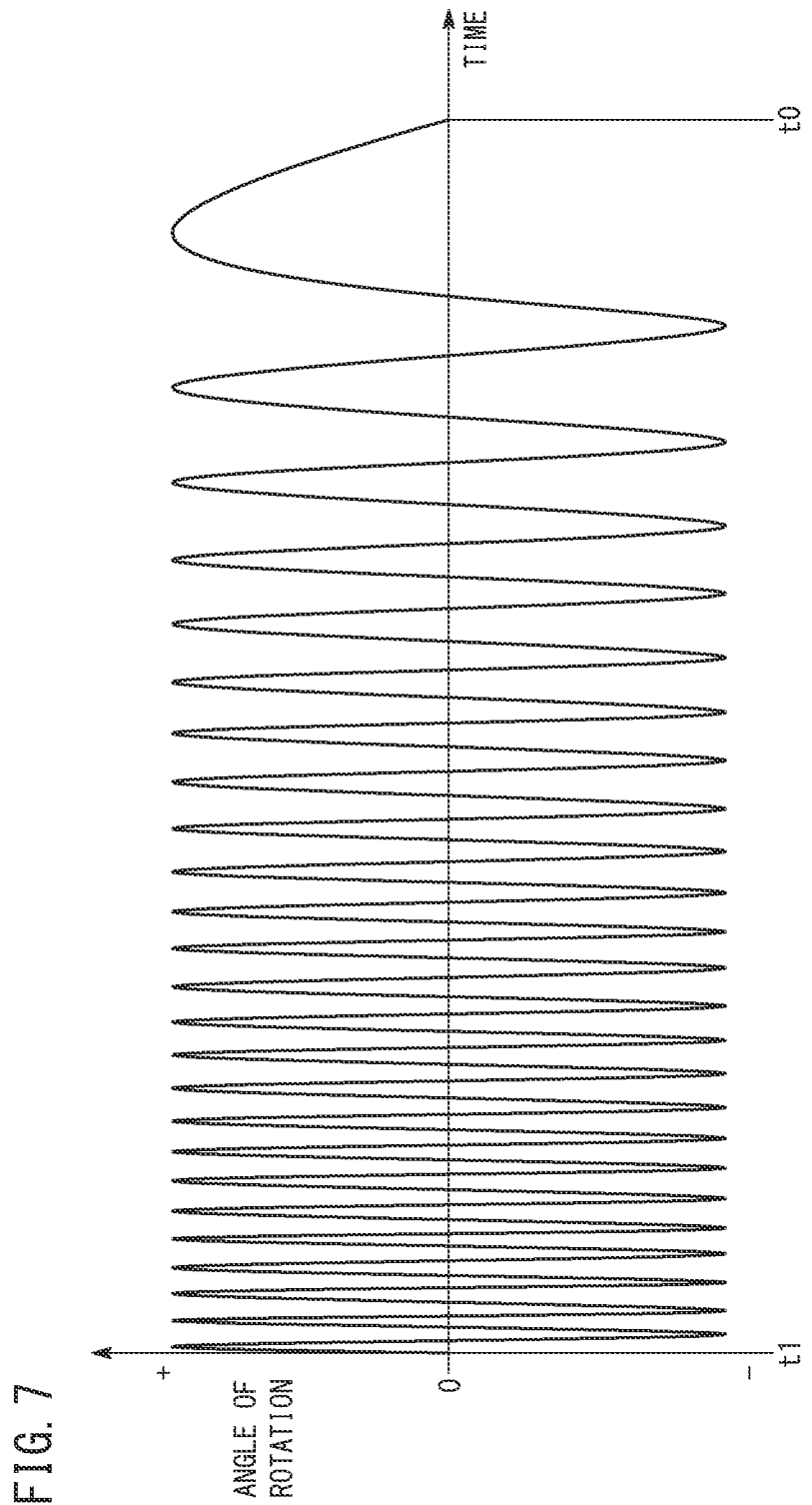
FIG. 7 is a diagram showing an example of a second swing command signal.

On the other hand, the second swing command signal SS2 is different from the swing command signal SS of the above-described embodiment. FIG. 7 is a diagram showing an example of the second swing command signal SS2. The value of "0" of the second swing command signal SS2 indicates the reference position. Further, the value of the second swing command signal SS2 having a + sign (positive sign) indicates an angle of rotation (amount of displacement) of the servomotor 32 that is rotated in the positive direction from the reference position. Further, the value of the second swing command signal SS2 having a − sign (negative sign) indicates an angle of rotation (amount of displacement) of the servomotor 32 that is rotated in the negative direction from the reference position. As the value (absolute value) of the second swing command signal SS2 moves further away from the reference position "0", the angle of rotation (amount of displacement) of the servomotor 32 with respect to the reference position becomes greater.

In the second swing command signal SS2, the frequency thereof changes so as to gradually become lower (down chirp) over time. The phrase "the frequency thereof gradually becomes lower" includes cases in which the frequency becomes lower continuously and smoothly, or cases in which the frequency becomes lower stepwise over time. Moreover, in the second swing command signal SS2, the frequency thereof may change so as to gradually become lower over time within a predetermined frequency range.

The swing frequency of the servomotor 32 (the movable mechanism 30) in accordance with the second swing command signal SS2 becomes lower over time. Moreover, the amplitude of the second swing command signal SS2 may be constant regardless of the passage of time. In the case that the amplitude is constant regardless of the passage of time, the angle of rotation (the amount of displacement) at which the servomotor 32 is rotated (displaced) in the forward direction from the reference position, and the angle of rotation (the amount of displacement) at which the servomotor 32 is rotated (displaced) in the reverse direction from the reference position is the same.

It is preferable for the second swing command signal SS2 (refer to FIG. 7) and the first swing command signal SS1 (refer to FIG. 3) to exhibit a correspondence relationship between an object and an image reflected in a plane mirror. In other words, the second swing command signal SS2 and the first swing command signal SS1 have a symmetrical relationship. The second swing command signal SS2 is brought about by reversing (t1→t0) the change over time (t0→t1) of the first swing command signal SS1. Moreover, the second swing command signal SS2 is input to the servomotor 32 in a direction toward t1→t0.

The swing command signal delivery unit 76X delivers the first swing command signal SS1 to the mechanism control unit 78 and the acquisition unit 80. The swing command signal delivery unit 76X, after having delivered the first swing command signal SS1, delivers the second swing command signal SS2 to the mechanism control unit 78 and the acquisition unit 80. Moreover, the swing command signal delivery unit 76X may deliver the first swing command signal SS1 to the mechanism control unit 78 and the acquisition unit 80 after having delivered the second swing command signal SS2 to the mechanism control unit 78 and the acquisition unit 80. Moreover, the swing command signal delivery unit 76 of the above-described embodiment may deliver the swing command signal SS and the second swing command signal SS2 to the mechanism control unit 78 and the acquisition unit 80.

The acquisition unit 80 acquires, for each of a predetermined plurality of spindle rotational speeds, the swing frequency characteristic (first swing frequency characteristic) at a time when the movable mechanism 30 is swung as the vibration source in accordance with the first swing command signal SS1, in a state in which the spindle 22 is rotating in accordance with the rotation command signal RS. Further, the acquisition unit 80 acquires, for each of the predetermined plurality of spindle rotational speeds, the swing frequency characteristic (second swing frequency characteristic) at a time when the movable mechanism 30 is swung as a vibration source in accordance with the second swing command signal SS2, in a state in which the spindle 22 is rotating in accordance with the rotation command signal RS. The display control unit 82 causes the display device 56 (see FIG. 2) to display the first swing frequency characteristic and the second swing frequency characteristic acquired by the acquisition unit 80.

In this instance, for example, when there is an abnormality such as loosening of a bolt of the servomotor 32 or the motive power transmission unit 34, there is a tendency for a difference to occur between the first swing frequency characteristic and the second swing frequency characteristic. The "abnormality" in this case becomes conspicuous in the case of an abnormality referred to as a "dead-band element" in terms of control theory.

This is because the vibration that occurs in the case that the machine tool main body 12 is swung in a manner so that the swing frequency characteristic becomes larger over time is likely to differ from the vibration that occurs in the case that the machine tool main body 12 is swung in a manner so that the swing frequency characteristic becomes smaller over time.

Accordingly, compared to the case of the above-described embodiment in which only the swing frequency characteristic at a time when a swinging motion is generated in a manner so that the swing frequency becomes higher over time is displayed, a more detailed cause of vibration can be presented to the operator.

(Exemplary Modification 2)

In the above-described embodiment, the display control unit 82 causes the characteristic diagram GF to be displayed on the display device 56. In addition to such a display, the display control unit 82 may cause a spindle rotational speed, which is recommended at a time of machining, to be displayed. In accordance with this feature, it is possible to present, to the operator, a rotational frequency that is as far away from the resonance frequency as possible so that the rotation is quieter and more stable, in a manner that is easy to understand visually or intuitively.

(Exemplary Modification 3)

The machine tool main body 12 of the above-described embodiment is provided with the movable mechanism 30 for causing one axis to be moved. However, the machine tool main body 12 may be provided with a plurality of the movable mechanisms 30 in order to cause multiple axes to be moved. In this case, a movable mechanism 30 in order to cause an X-axis to be moved, a movable mechanism 30 in order to cause a Y-axis to be moved, and a movable mechanism 30 in order to cause a Z-axis to be moved can be included.

In the case that a plurality of the movable mechanisms 30 are provided in the machine tool main body 12, the vibration diagnosis support device 50 may be provided in common with respect to the plurality of the movable mechanisms 30, or the vibration diagnosis support device 50 may be provided for each one of the plurality of the movable mechanisms 30.

Moreover, in the case that a plurality of the movable mechanisms 30 are provided in the machine tool main body 12, the swing frequency characteristics (gain characteristics) concerning the servomotors 32 possessed respectively by the plurality of the movable mechanisms 30 are acquired. In this case, since the vibration characteristics of the machine tool main body 12 can be captured in greater detail, a movable mechanism 30 that is closest in proximity to an abnormal location can be clearly made apparent.

(Exemplary Modification 4)

Figure 8:
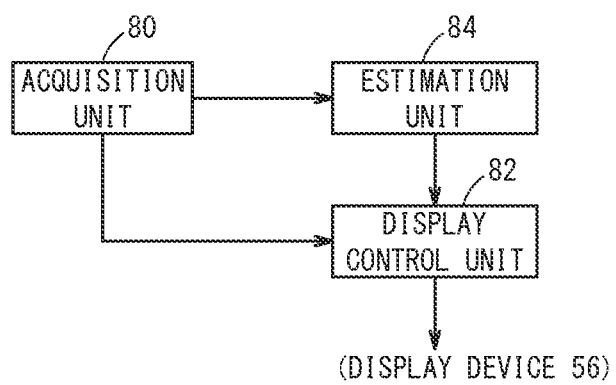
FIG. 8 is a diagram showing a portion of a vibration diagnosis support device according to an Exemplary Modification 4.

FIG. 8 is a diagram showing a portion of the vibration diagnosis support device 50 according to an Exemplary Modification 4. Moreover, it should be noted that the same reference numerals are assigned to the same constituent elements as those described in the above embodiment. In the Exemplary Modification 4, descriptions that overlap or are duplicative of those stated in the above-described embodiment will be omitted.

The vibration diagnosis support device 50 according to the Exemplary Modification 4 is newly equipped with an estimation unit 84 in addition to the above-described embodiment.

An abnormal frequency is input to the estimation unit 84 from the input device 52 in accordance with an operation made by the operator. The abnormal frequency is a frequency that is measured to be greater than a predetermined threshold value using a well-known measurement technique.

On the basis of the swing frequency characteristics acquired by the acquisition unit 80, the estimation unit 84 estimates the origin (cause) of the abnormal frequency. In the case that the abnormal frequency is input from the input device 52, then based on the swing frequency characteristics acquired by the acquisition unit 80, the estimation unit 84 estimates whether the abnormal frequency is derived from a fixed source or a rotating source in the spindle unit 20.

As noted previously, in the peak groups PLC1 and PLC4, in which the frequencies at which the peaks of the swing frequency characteristics appear are approximately constant regardless of the spindle rotational speed, resonance with a natural frequency of a stationary element occurs. Therefore, if the difference between the frequency indicating a substantially constant peak regardless of the spindle rotational speed, and the abnormal frequency lies within an allowable range, the possibility is high that the abnormal frequency is derived from a fixed source.

On the other hand, as noted previously, in the peak groups PLC2, PLC3, PLC5, and PLC6, in which the frequencies at which the peaks of the swing frequency characteristics appear change in accordance with a change in the spindle rotational speed, resonance between the frequency of the diagnosis target and a natural frequency of a certain elastic element that is in conjunction with the rotation occurs. Therefore, if the difference between the frequency indicating the peak that changes in accordance with the spindle rotational speed, and the abnormal frequency lies within an allowable range, the possibility is high that the abnormal frequency is derived from a rotating source.

In other words, in the case that the input abnormal frequency lies within a first range, the estimation unit 84 estimates that the abnormal frequency is derived from a fixed source. The first range is a ± range that is centered on a frequency that is constant regardless of the spindle rotational speed, among the frequencies at which the peaks of the swing frequency characteristics appear. On the other hand, in the case that the input abnormal frequency lies within the second range, the estimation unit 84 estimates that the abnormal frequency is derived from a rotating source. The second range is a variation range within which the frequency at which the peak of the swing frequency characteristic appears changes in accordance with an increase in the spindle rotational speed.

In the case that the estimation of the origin with respect to the abnormal frequency is completed, the estimation unit 84 delivers the result of the estimation to the display control unit 82. In this case, the display control unit 82 causes the display device 56 to display the estimation result of the estimation unit 84. Consequently, it is possible to present the estimated result of the cause of the abnormal vibration.

(Exemplary Modification 5)

In the above-described embodiment, although the spindle control unit 74 causes the spindle 22 to be rotated by electricity, the spindle 22 may be rotated by a fluid. Moreover, the fluid, for example, is compressed air or the like.

(Exemplary Modification 6)

Only the line LN of the characteristic diagram GF may be drawn. As a method of drawing only the line LN with a simple method, it is possible to draw the line with a minimum number of elements and in a short time period, by drawing the vibration data obtained when the rotation shaft is accelerated or decelerated. In this case, the rotation shaft itself also serves as the vibration source. In the case that only the line LN is drawn, the sound pressure, the vibration, and the current waveform at a time when the other shafts are stopped may be used, a power spectral density may be obtained from a Fourier spectra of these waveforms, and the power spectral density with respect to the rotational frequency may be displayed as the frequency characteristic.

(Exemplary Modification 7)

In the above-described embodiment, the transport line TL is the primary mode (rotational frequency of the rotation shaft=the swing frequency). The actual resonance also occurs at frequencies that are n times the rotational frequency (where n is a natural number). Accordingly, in the characteristic diagram GF, it is preferable to also draw transport lines TL having slopes that are n times (where n is a natural number) with respect to the rotational frequency. The line LN, which is drawn in the case that these transport lines TL (transport planes) and the acquired peak groups PLC1 to PLC6 intersect, can become an n-th order resonance point. For example, in the case that the machine tool 10 is a machining center, and the tool attached to the spindle 22 is a two-blade end mill, the spindle 22 vibrates at a frequency that is two times the spindle rotational speed. In this case, the line LN, which is drawn in the case that the secondary transport line TL (transport plane) and the peak groups PLC1 to PLC6 intersect, becomes the resonance points, and therefore, it is necessary to select the spindle rotational speed in a manner so as to avoid such points. In this manner, not only the primary transport line TL, but also the line LN, which is drawn in the case of intersecting a higher-order transport line TL (transport plane), is utilized, and therefore, in the characteristic diagram GF, all of the drawn peak groups PLC1 to PLC 6 are used as a helpful source of information.

(Exemplary Modification 8)

In the above-described embodiment, for each of the plurality of predetermined rotational speeds, the acquisition unit 80 acquires the swing frequency characteristics at a time when the movable mechanism 30 is swung in a state in which the spindle 22 that is installed on the spindle unit 20 is rotating. The spindle 22 is merely an example, and a rotation shaft other than the spindle 22 may be applied. For example, in the case that the machine tool 10 has a table that is capable of being rotated, the rotation shaft of such a table may be applied. In other words, any type of rotation shaft may be used, insofar as it is a rotation shaft in the machine tool 10. This is because, for each of the plurality of predetermined rotational speeds, the acquisition unit 80 acquires the swing frequency characteristics at a time when the movable mechanism 30 is swung in a state in which the rotation shaft which is installed on the rotation shaft unit is rotating, and thus it is possible to obtain the same effects as those of the above-described embodiment.

The inventions that are capable of being grasped from the above-described embodiments and the exemplary modifications will be described below.

(First Invention)

A first invention is characterized by the vibration diagnosis support device (50) that supports the diagnosis of vibration of the rotation shaft unit (for example, the spindle unit (20)) of the machine tool (10) having the numerical control device. The vibration diagnosis support device is equipped with the movable mechanism (30) installed on the machine tool, the mechanism control unit (78) that drives the movable mechanism, the swing command signal delivery unit (76, 76X) that delivers, to the mechanism control unit, the first swing command signal (SS1) in which the frequency thereof changes so as to become higher over time, or the second swing command signal (SS2) in which the frequency thereof changes so as to become lower over time, the rotation shaft control unit (for example, the spindle control unit (74)) that rotates the rotation shaft (for example, the spindle (22)) installed on the rotation shaft unit, the rotation command signal delivery unit (72) that delivers the rotation command signal (RS) to the rotation shaft control unit, the acquisition unit (80) that acquires the swing frequency characteristic of the rotation shaft for each of the plurality of predetermined rotational speeds, at a time when the movable mechanism is swung in accordance with the first swing command signal or the second swing command signal in a state in which the rotation shaft is rotating in accordance with the rotation command signal, and the display control unit (82) that causes the display device (56) to display thereon the swing frequency characteristic acquired by the acquisition unit.

In accordance with such features, it is possible to indicate the rotational speed (rotational frequency) at which resonance is likely to occur when the movable mechanism is swung, and as a result, a detailed frequency characteristic of the rotation shaft unit can be captured while taking into account a natural frequency unique to the rotation shaft.

The acquisition unit may acquire the first swing frequency characteristic at the time when the movable mechanism is swung in accordance with the first swing command signal in the state in which the rotation shaft is rotating in accordance with the rotation command signal, and may acquire the second swing frequency characteristic at the time when the movable mechanism is swung in accordance with the second swing command signal in the state in which the rotation shaft is rotating in accordance with the rotation command signal, and the first swing command signal may be a signal the frequency of which changes so as to gradually become higher over time within a predetermined frequency range, and the second swing command signal may be a signal the frequency of which changes so as to gradually become lower over time within a predetermined frequency range. In accordance with such features, it is possible to more accurately and in detail indicate the rotational speed (rotational frequency) at which resonance is likely to occur when the movable mechanism is swung.

The amplitude of each of the first swing command signal and the second swing command signal may be constant. In accordance with this feature, it is possible to obtain a swing frequency characteristic in the case that the movable mechanism is swung with a constant amplitude.

The rotation shaft unit may be installed on the movable mechanism. In accordance with this feature, compared to a case in which the rotation shaft unit is not installed on the movable mechanism, it is possible to acquire in detail the rotational speed (rotational frequency) at which resonance is likely to occur when the movable mechanism is swung.

The rotation shaft control unit may cause the rotation shaft to be rotated by electricity or a fluid. In accordance with this feature, it becomes easy to rotate the rotation shaft smoothly.

The swing frequency characteristic may be a frequency characteristic of any one from among an amplitude, a speed, an acceleration, and a sound pressure of noise, at the time when the movable mechanism is swung. In accordance with this feature, it is possible to indicate in detail the rotational speed (rotational frequency) at which resonance is likely to occur when the movable mechanism is swung.

The display control unit may cause the swing frequency characteristic for each of the rotational speeds of the rotation shaft, to be displayed in the characteristic diagram (GF) in which the first axis thereof is the rotational speed of the rotation shaft, the second axis thereof is the swing frequency, and the third axis thereof is a quantity representing the magnitude of vibration. In accordance with such features, the swing frequency characteristics can be indicated in an easily understandable manner, as compared to a characteristic diagram in which the first axis thereof is the rotational speed of the rotation shaft and the second axis thereof is the swing frequency. Moreover, it is preferable for the measurement data to be smoothly interpolated and displayed. The interpolation methods include, for example, a Lagrangian interpolation or a spline interpolation or the like. The accuracy becomes higher as the amount of data of the swing frequency characteristics on which the diagnosis is based is larger. Thus, it is preferable to obtain the swing frequency characteristics in relation to a greater number of rotational speeds. For example, an operation may be performed in which a program is run that automatically executes the content shown in FIG. 5, and data are acquired in order to automatically draw a detailed characteristic diagram in an unattended manner. In particular, by carrying out such an operation using a time period at night or during a holiday when the machine tool is not in operation, it is possible to obtain a more detailed and accurate characteristic diagram.

On the basis of the preset threshold value, the display control unit may cause the range of rotational speed (WP) of the rotation shaft that is suitable for machining, to be displayed. Consequently, even an inexperienced operator can easily narrow down a rotational speed region for the rotation shaft that is suitable for machining.

The display control unit may cause the range of rotational speed of the rotation shaft that is suitable for machining, to be displayed. In accordance with this feature, it is easier to select a rotational speed of the rotation shaft that is suitable for machining.

The rotation shaft unit may be the spindle unit that is installed on the machine tool, and the rotation shaft may be a spindle that is installed on the machine tool and controlled by the numerical control device, and the movable mechanism may be a mechanism that is installed on the machine tool and operated along the movement axis controlled by the numerical control device. In accordance with such features, it is possible to obtain a highly-accurately machined surface.

(Second Invention)

A second invention is characterized by the machine tool, including the above-described vibration diagnosis support device, at least one of the rotation shaft unit or the spindle unit, and at least one of the movable mechanism.

Because the aforementioned vibration diagnosis support device is provided, it is possible to indicate the rotational speed (rotational frequency) at which resonance is likely to occur when the movable mechanism is swung, and as a result, a frequency characteristic of the rotation shaft unit can be captured while taking into account a natural frequency unique to the rotation shaft.

(Third Invention)

A third invention is characterized by the vibration diagnosis support method for supporting the diagnosis of vibration of the rotation shaft unit (for example, the spindle unit) of the machine tool. The vibration diagnosis support method includes the rotating step (S1) of rotating the rotation shaft installed on the rotation shaft unit, in accordance with a rotation command signal, the swinging step (S2) of swinging the movable mechanism of the machine tool in accordance with the first swing command signal in which the frequency thereof changes so as to become higher over time, or the second swing command signal in which the frequency thereof changes so as to become lower over time, the acquisition step (S3) of acquiring the swing frequency characteristic for each of the plurality of predetermined rotational speeds, at a time when the movable mechanism is swung in accordance with the first swing command signal or the second swing command signal in a state in which the rotation shaft is rotating in accordance with the rotation command signal, and the display control step (S6) of causing the display device to display thereon the swing frequency characteristic acquired in the acquisition step.

In accordance with such features, it is possible to indicate the rotational speed (rotational frequency) at which resonance is likely to occur when the movable mechanism is swung, and as a result, a frequency characteristic of the rotation shaft unit can be captured while taking into account a natural frequency unique to the rotation shaft.

The rotation shaft unit may be the spindle unit that is installed on the machine tool, and the rotation shaft may be a spindle that is installed on the machine tool and controlled by the numerical control device, and the movable mechanism may be a mechanism that is installed on the machine tool and operated along the movement axis controlled by the numerical control device. In accordance with such features, it is possible to obtain a highly-accurately machined surface.

The invention claimed is:

1. A vibration diagnosis support device configured to support diagnosis of vibration of a rotation shaft unit of a machine tool including a numerical control device, the vibration diagnosis support device comprising:
   a movable mechanism installed on the machine tool;
   a mechanism control unit configured to drive the movable mechanism;
   a swing command signal delivery unit configured to deliver, to the mechanism control unit, a first swing command signal in which a frequency thereof changes so as to become higher over time, or a second swing command signal in which a frequency thereof changes so as to become lower over time;
   a rotation shaft control unit configured to rotate a rotation shaft installed on the rotation shaft unit;
   a rotation command signal delivery unit configured to deliver a rotation command signal to the rotation shaft control unit;
   an acquisition unit configured to acquire a swing frequency characteristic of the rotation shaft for each of a plurality of predetermined rotational speeds, at a time when the movable mechanism is swung in accordance with the first swing command signal or the second swing command signal in a state in which the rotation shaft is rotating in accordance with the rotation command signal; and a display control unit configured to cause a display device to display thereon the swing frequency characteristic acquired by the acquisition unit.

2. The vibration diagnosis support device according to claim 1, wherein:
the acquisition unit acquires a first swing frequency characteristic at the time when the movable mechanism is swung in accordance with the first swing command signal in the state in which the rotation shaft is rotating in accordance with the rotation command signal, and acquires a second swing frequency characteristic at the time when the movable mechanism is swung in accordance with the second swing command signal in the state in which the rotation shaft is rotating in accordance with the rotation command signal; and
the first swing command signal is a signal the frequency of which changes so as to gradually become higher over time within a predetermined frequency range, and the second swing command signal is a signal the frequency of which changes so as to gradually become lower over time within a predetermined frequency range.

3. The vibration diagnosis support device according to claim 1, wherein an amplitude of each of the first swing command signal and the second swing command signal is constant.

4. The vibration diagnosis support device according to claim 1, wherein the rotation shaft unit is installed on the movable mechanism.

5. The vibration diagnosis support device according to claim 1, wherein the rotation shaft control unit causes the rotation shaft to be rotated by electricity or a fluid.

6. The vibration diagnosis support device according to claim 1, wherein the swing frequency characteristic is a frequency characteristic of any one from among an amplitude, a speed, an acceleration, and a sound pressure of noise, at the time when the movable mechanism is swung.

7. The vibration diagnosis support device according to claim 1, wherein the display control unit causes the swing frequency characteristic for each of rotational speeds of the rotation shaft, to be displayed in a characteristic diagram in which a first axis thereof is the rotational speed of the rotation shaft, a second axis thereof is a swing frequency, and a third axis thereof is a quantity representing a magnitude of vibration.

8. The vibration diagnosis support device according to claim 1, wherein the display control unit causes a range of rotational speed of the rotation shaft that is suitable for machining, to be displayed, based on a preset threshold value.

9. The vibration diagnosis support device according to claim 1, wherein the display control unit causes a range of rotational speed of the rotation shaft that is suitable for machining, to be displayed.

10. The vibration diagnosis support device according to claim 1, wherein the rotation shaft unit is a spindle unit that is installed on the machine tool, and the rotation shaft is a spindle that is installed on the machine tool and that is configured to be controlled by the numerical control device, and the movable mechanism is a mechanism that is installed on the machine tool and that is configured to be operated along a movement axis controlled by the numerical control device.

11. A machine tool comprising the vibration diagnosis support device according to claim 1, at least one of the rotation shaft unit or a spindle unit, and at least one of the movable mechanism.

12. A vibration diagnosis support method for supporting diagnosis of vibration of a rotation shaft unit of a machine tool, the vibration diagnosis support method comprising:
a rotating step of rotating a rotation shaft installed on the rotation shaft unit, in accordance with a rotation command signal;
a swinging step of swinging a movable mechanism of the machine tool in accordance with a first swing command signal in which a frequency thereof changes so as to become higher over time, or a second swing command signal in which a frequency thereof changes so as to become lower over time;
an acquisition step of acquiring a swing frequency characteristic for each of a plurality of predetermined rotational speeds, at a time when the movable mechanism is swung in accordance with the first swing command signal or the second swing command signal in a state in which the rotation shaft is rotating in accordance with the rotation command signal; and
a display control step of causing a display device to display thereon the swing frequency characteristic acquired in the acquisition step.

13. The vibration diagnosis support method according to claim 12, wherein the rotation shaft unit is a spindle unit that is installed on the machine tool, and the rotation shaft is a spindle that is installed on the machine tool and that is configured to be controlled by a numerical control device, and the movable mechanism is a mechanism that is installed on the machine tool and that is configured to be operated along a movement axis controlled by the numerical control device.

* * * * *